(12) United States Patent
Leppelt et al.

(10) Patent No.: US 10,137,433 B2
(45) Date of Patent: Nov. 27, 2018

(54) CATALYST AND METHOD FOR PREPARING A CATALYST

(71) Applicant: JOHNSON MATTHEY CATALYSTS (GERMANY) GMBH, Redwitz (DE)

(72) Inventors: Rainer Leppelt, Redwitz (DE); Jörg Werner Münch, Redwitz (DE); Dominic Santi, Redwitz (DE)

(73) Assignee: JOHNSON MATTHEY CATALYSTS (GERMANY) GMBH, Redwitz (DE)

( * ) Notice: Subject to any disclaimer, the term of this patent is extended or adjusted under 35 U.S.C. 154(b) by 0 days.

(21) Appl. No.: 15/367,283

(22) Filed: Dec. 2, 2016

(65) Prior Publication Data

US 2017/0209849 A1    Jul. 27, 2017

(30) Foreign Application Priority Data

Dec. 4, 2015    (DE) .................. 10 2015 224 370

(51) Int. Cl.
*B01J 21/06* (2006.01)
*B01J 23/22* (2006.01)
(Continued)

(52) U.S. Cl.
CPC ........ *B01J 21/063* (2013.01); *B01D 53/9436* (2013.01); *B01J 21/04* (2013.01); *B01J 23/22* (2013.01); *B01J 27/16* (2013.01); *B01J 31/069* (2013.01); *B01J 35/0006* (2013.01); *B01J 35/0013* (2013.01); *B01J 35/04* (2013.01); *B01J 35/10* (2013.01); *B01J 37/0217* (2013.01); *B01J 37/0219* (2013.01); *B01J 37/0244* (2013.01); *B01D 53/9418* (2013.01); *B01D 2251/2062* (2013.01); *B01D 2255/2092* (2013.01); *B01D 2255/20707* (2013.01); *B01D 2255/20723* (2013.01); *B01D 2255/20776* (2013.01);
(Continued)

(58) Field of Classification Search
None
See application file for complete search history.

(56) References Cited

U.S. PATENT DOCUMENTS 7,188,469 B2    3/2007    Bonadies et al.
2013/0136662 A1    5/2013    Choi et al.
(Continued)

FOREIGN PATENT DOCUMENTS

DE    102006014999 A1    3/2007
DE    102007016480 A1    10/2008
(Continued)

*Primary Examiner* — Colin W. Slifka

(57) ABSTRACT

A catalyst with a porous, ceramic support body having a porosity which is formed by pores in at least a part of the ceramic support body, and which furthermore has a catalytically active washcoat coating applied to the ceramic support body, which catalytically active washcoat coating having a layer thickness, comprises a permanent catalytically inactive impregnation comprising at least one catalytically inactive inorganic component, and wherein the permanent inactive impregnation has a layer thickness and is present at least partially between a surface of the porous ceramic support body and the catalytically active washcoat coating is present in the pores of the ceramic support body in a region with reduced porosity underneath the surface of the ceramic support body.

21 Claims, 2 Drawing Sheets

Figure 1:
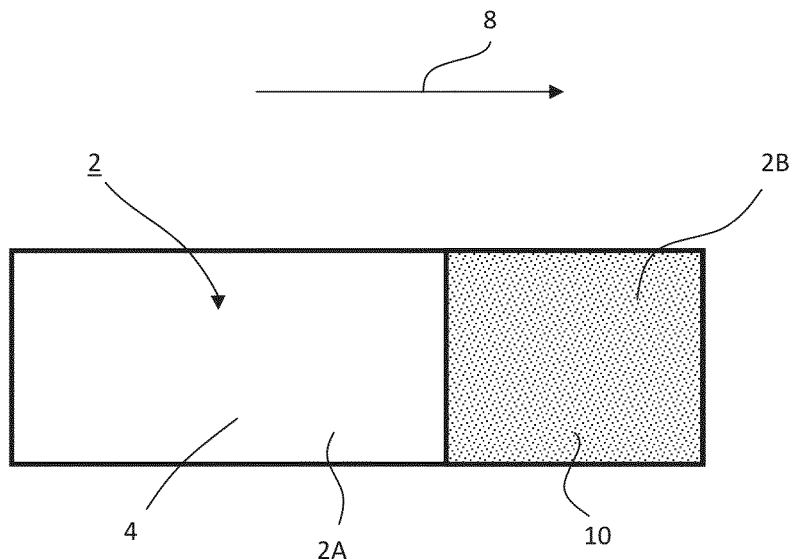

(51) Int. Cl.
   *B01J 35/10*   (2006.01)
   *B01J 37/02*   (2006.01)
   *B01J 35/00*   (2006.01)
   *B01J 21/04*   (2006.01)
   *B01D 53/94*   (2006.01)
   *B01J 27/16*   (2006.01)
   *B01J 31/06*   (2006.01)
   *B01J 35/04*   (2006.01)

(52) U.S. Cl.
   CPC ...... *B01D 2255/30* (2013.01); *B01D 2255/40* (2013.01); *B01D 2255/9032* (2013.01); *B01D 2255/9202* (2013.01); *B01D 2255/9205* (2013.01); *B01D 2257/404* (2013.01); *B01D 2257/406* (2013.01)

(56) References Cited

U.S. PATENT DOCUMENTS

| | | |
|---|---|---|
| 2014/0157763 A1 | 6/2014 | Chandler et al. |
| 2015/0037233 A1 | 2/2015 | Fedeyko et al. |

FOREIGN PATENT DOCUMENTS

| | | |
|---|---|---|
| DE | 102007021471 A1 | 11/2008 |
| DE | 102007023120 A1 | 11/2008 |
| DE | 102012213639 A1 | 2/2013 |
| DE | 112013000477 T5 | 10/2014 |
| DE | 102014110811 A1 | 2/2015 |
| EP | 1663515 B1 | 6/2013 |
| WO | 2001012320 A1 | 2/2001 |

CATALYST AND METHOD FOR PREPARING A CATALYST

CROSS-REFERENCE TO RELATED APPLICATIONS

This application claims priority to German Patent Application No. DE 10 2015 224 370.2, filed on Dec. 4, 2015, and is incorporated herein by reference.

The invention relates to a catalyst having a porous, ceramic support body having pores and a catalytically active washcoat coating applied thereto. The invention furthermore relates to a method for preparing such a catalyst.

The catalyst is in this case particularly designed for exhaust gas treatment, specifically in the automotive field and particularly for nitrogen oxide reduction by the so-called SCR process (selective catalytic reduction). In the SCR process, nitrogen oxides present in the exhaust gas are reduced using a nitrogen-containing reducing agent, typically ammonia, as an aqueous urea solution for example.

For the treatment of exhaust gas, various catalyst types are available in principle. The various catalyst types differ firstly with respect to their design and secondly with respect to their catalytic activities with regard to the catalytically active components used.

For treatment of exhaust gas, particularly in motor vehicles, ceramic honeycomb catalysts are frequently used, through which the exhaust gas flows under operation. These catalysts often take the form of extruded ceramic bodies. They usually have a circular cross section. The catalysts in operation are typically exposed to temperatures in the range of 200-700 degrees Celsius.

In addition to SCR catalysts, further catalysts are known for oxidizing carbon monoxide to carbon dioxide, for oxidizing unburned hydrocarbons to water (steam) and carbon monoxide or even for the cyclic adsorption of nitrogen oxides (NOx) from exhaust gas from a lean burn engine, followed by desorption and reduction of NOx in a hydrocarbon-rich exhaust gas. If the vehicle engine is controlled to at least approximately stoichiometric operation, a simultaneous catalytic oxidation of carbon monoxides and unburned hydrocarbons and also the reduction of nitrogen oxides is possible by the so-called three-way catalytic converter.

In addition to these conventional catalysts, there are also combined catalysts in which a filter effect is combined with a catalytic effect. For this purpose, so-called wall-flow filters are used, for example, which are catalytically activated. Wall-flow filters are honeycomb filters having a honeycomb body with an array of intersecting porous walls, the walls defining an array of parallel first and second channels extending in the longitudinal direction. The first channels are sealed at a first end of the honeycomb body and the second channels are sealed at a second end of the honeycomb body. A specific field of use here is that of catalysed soot filters (CSF) which are used especially for the automotive sector.

An established class of catalyst specifically for an SCR catalyst is based on a particular oxidic titanium-vanadium system (e.g. $V_2O_5/TiO_2$ or $V_2O_5/WO_3/TiO_2$), with vanadium oxide as catalytically active component on a titanium oxide support material. This titanium-vanadium system can generally be assigned to a class of catalyst based on a base metal, vanadium in this case, in a metal oxide support.

In addition, there are catalyst systems based on noble metals and also further catalyst systems based on catalytically active or activated molecular sieves, particularly zeolites.

The catalysts used nowadays in motor vehicles are predominantly based on ceramic honeycomb catalysts. In operation, the exhaust gas to be cleaned flows through the channels of an extruded catalyst body for example. A basic distinction is made here between so-called all-active extrudates and coated supports, called "washcoats". In the all-active extrudates, a catalytically active catalyst composition forms the extruded body, meaning that the channel walls of the catalyst are formed completely from a catalytically active material. In the washcoats, a catalytically inert extruded support body is coated with the actual catalytically active catalyst material. This is effected, for example, by dipping the extruded support body into a suspension containing the catalyst material.

To prepare either an all-active extrudate catalyst or an inert support body, ceramic starting components, usually in powder form, are mixed with each other and processed to a ceramic material. In the case of extruded bodies, this customarily pasty composition is then extruded for preparing, for example, a honeycomb body. The so-called "green" body thus obtained is then subjected to a temperature treatment to form the ceramic finished body.

In the SCR process, the required reducing agent is often added in excess. In such processes, therefore, there is regularly the risk that the reducing agent is discharged to the environment unused and thereby pollutes it. In order to avoid this so-called slippage, so-called ASC or ammonia slip catalysts are known, which are typically arranged in the direction of flow of the exhaust gas following an SCR catalyst and oxidize excess reducing agent, in particular, ammonia ($NH_3$).

An ASC catalyst is apparent from DE 102014110811 A1. In this case in the embodiment variant according to FIG. 1C described therein, a layer sequence of catalytically different layers is applied as washcoat coating to a catalytically inactive support. A first (lower) oxidation layer is applied downstream to the support for oxidation of $NH_3$ and is covered by an SCR layer, which is additionally also applied upstream of the first oxidation layer directly to the support. The SCR layer is in turn covered by a second oxidation layer in order to selectively reduce so-called secondary nitrogen oxides. Cordierite is frequently used as support material for washcoat coatings.

An extruded honeycomb catalyst with a catalytically active extruded support material is known from DE 102012213639 A1. Also described in this document is a combination of a highly porous, active honeycomb body having a washcoat coating. Inter alia, a noble metal coating is applied in this case to a rear portion of the extruded honeycomb body to form an ASC sub-region.

EP 1663515 B1 describes the application of the washcoat coatings to a porous support body as a problem since, on application of the suspension for the washcoat coating, this penetrates into micro-cracks of the support body in an undesired manner and then negatively affects the mechanical properties thereof. To reduce this problem, for example, the use of an organic pre-coating is indicated, which is applied prior to applying the actual catalytically active washcoat. By means of this organic pre-coating, the components of the washcoat coating are prevented from penetrating into the micro-cracks. At the same time, it is ensured, due to the low temperature stability of the organic pre-coating, that these will be again removed thermally in the subsequent sintering process, so that the desired and required porosity for the catalytic function of the catalyst is maintained.

In the direct application of a washcoat coating onto a catalytically active support body, it may furthermore lead to an exchange of components between the two different catalytically active materials at the boundary layer, for example, by ion migration. This may lead to impairment of the catalytic activity of the respective catalytically active material.

Against this background, the object of the present invention is to provide a catalyst having a porous support body and a washcoat coating applied thereto, which has good mechanical properties and a sustainably good catalytic activity. The object of the invention is also to provide a method for preparing a catalyst of this kind.

The object is achieved according to the invention by a catalyst having the features of claim 1. The catalyst comprises firstly a porous, ceramic support body which at least in a sub-region has a porosity which is formed by pores, and which has a catalytically active washcoat coating with a predetermined layer thickness. Furthermore, the support body is provided with a permanent catalytically inactive impregnation comprising at least one inorganic component. To form this permanent impregnation, at least one of the two following measures is taken: the at least one inorganic component is introduced into the support body close to the surface whereupon the porosity of the support body is reduced at least in the region of the surface. The impregnation is therefore present in the pores in a region which is close to the surface and has a reduced porosity. Alternatively, or additionally, the impregnation has a layer thickness, therefore it is formed as an additional inorganic intermediate layer comprising the at least one inorganic component. This intermediate layer is applied in this case particularly in the manner of a washcoat coating at least in a sub-region between a surface of the ceramic support body and the actual catalytically active washcoat coating. The permanent impregnation and the at least one inorganic component are in this case catalytically inactive, therefore having no catalytic activity with regard to the exhaust gas treatment.

In the present case, "catalyst" in each case is understood to mean the objective form of a component having a catalytic effect, which comprises catalytically active components.

By attaching the permanent impregnation before applying the actual washcoat coating, two advantageous effects are achieved selectively or in combination. Firstly, by applying the impregnation, the penetration of water into the ceramic support body on applying the washcoat suspension is at least reduced. Investigations have shown that, in highly porous support bodies, as are used, for example, in extruded honeycomb catalysts, water from the washcoat suspension penetrates the porous body on applying the suspension, which disadvantageously leads to an undesirable non-uniform coating thickness and coating depth of the catalytically active washcoat coating. Furthermore, this can lead to a total blockage of channels.

By the formation as a permanent impregnation, the particular advantage is also achieved during operation that the migration of constituents into or out of the support body, i.e. between the support body and washcoat, and the consequent deterioration of the catalytic activity is at least reduced. Therefore, the different catalytic activities of the support substrate on the one hand and the washcoat coating on the other hand are permanently maintained by reducing or preventing such migration. Age-related reductions in the catalytic activity are therefore minimized by this measure, i.e. a high catalytic activity is maintained. In an ASC catalyst, a high $NH_3$ conversion rate is therefore maintained.

To apply the washcoat coating, an aqueous suspension comprising catalytically active components is generally usually first applied to the support body and subsequently thermally treated, so that a ceramic coating is formed as a washcoat coating.

Overall, therefore, firstly the formation of a defined washcoat coating with preferably very homogeneous layer thickness and coating depth is ensured by applying the permanent impregnation and, secondly, the migration of ions between the catalytically active layers is prevented. This leads overall to a catalyst with good catalytic properties, which are retained permanently and in the long term.

Expediently, the support body is a monolithic component in which preferably only a sub-region is provided with the impregnation. In this case, the impregnation is applied expediently only to a sub-region to which the washcoat coating is also applied. Incidentally, the uncoated sub-region of the support body itself forms a catalytically active region, hence the support body itself preferably consists of a catalytically active material.

In particular, it is further provided in an expedient configuration that the monolithic support body is provided in a front region as an SCR sub-region and in a rear region with the washcoat coating and is formed as an ASC sub-region. The catalytic converter therefore has a front SCR sub-region and a rear ASC sub-region. It is understood hereinafter that the sub-regions both have a catalytic effect on the SCR reaction and also on the oxidation of $NH_3$. The terms "front" and "rear" refer here to the direction of flow of an exhaust gas in terms of the intended use, which flows through the catalyst in a direction of flow. The ASC sub-region is therefore formed following the SCR sub-region in the direction of flow. A so-called ammonia slippage is thereby reliably prevented when using ammonia as reducing agent for the SCR catalysis. By way of example, 10-30% of the length, i.e. the axial length, of the support body is provided with the impregnation and the washcoat coating formation of the ASC sub-region.

In order to form the impregnation on the support body, an impregnating agent is initially applied to the support body during the preparation. The impregnating agents used in this case, selectively or in combination, are sols, particularly titanium sols or silicon sols, water glass, silanes, particularly alkylsilanes, siloxanes or phosphates, particularly aluminium phosphates. These impregnating agents comprise the at least one permanent inorganic component. The impregnating agent is therefore generally applied as a fluid in the liquid or also pasty state, for example as an aqueous solution, as a suspension or also dispersion. This is carried out, for example, by dipping of the support body into the impregnating agent or also by spraying of the same etc.

The sols referred to are generally colloidal solutions or dispersions in which nanoscale particles, i.e. for example titanium oxide ($TiO_2$) or silicon oxide particles ($SiO_2$), partly also with the aid of stabilizers (e.g. acetates), are kept in solution.

Water glass is generally understood to mean amorphous, water-soluble sodium, potassium and also lithium silicates. Preference is given to using sodium water glasses.

The silanes consist of a silicon base structure and hydrogen. The silicon base structure can be an unbranched (linear) or a branched silicon chain.

So-called alkylsilanes are preferably used, i.e. silanes in which one or more hydrogen atoms have been replaced by alkyl groups of varying size. An alkylsilane particularly used is a propyltriethoxysilane, an example being that which is obtainable under the trade name Dynasylan, especially Dynasylan PTEO from Evonik Industries AG.

As an alternative to the silanes or in addition, siloxanes are used in which the silicon atoms are attached to one another via oxygen atoms in the base structure. A siloxane used is, for example, an alkylsiloxane, an example being that which is obtainable under the trade name Dynasylan 9896 from Evonik Industries AG.

Furthermore, phosphates have proven to be suitable and in particular aluminium phosphates in this regard. In particular, a monoaluminium phosphate solution is used, an example being that which is obtainable under the trade name LITHOPIX P1 from Zschimmer & Schwarz GmbH & Co. KG Chemische Fabriken. In this case, preference is given to using an at least 25% aluminium phosphate solution and more preferably an at least 50% aluminium phosphate solution, i.e. solutions, in particular aqueous solutions, having a solids content of at least 25% or of at least 50%. Here, the solids content for the most part (>80%, especially >90%) consists of aluminium phosphate (monoaluminium phosphate or aluminium metaphosphate). The proportions of aluminium and of phosphate in the aluminium phosphate in this case correspond to a mixing ratio of $Al_2O_3$ to $P_2O_5$ from about 1:3 to 1:20, especially from about 1:3 to 1:5. LITHOPIX P1 has a ratio of about 1:4.

The proportion and/or the particle size of the inorganic components within the generally aqueous solution of the impregnating agent depends in this case on the particular application purpose, and in particular whether the penetration is desired in a region near the surface of the support body or whether the formation of an inorganic intermediate layer is desired.

In an expedient configuration, the pores of the porous support body are sealed by the permanent impregnation, i.e. by the inorganic components present therein. Overall, therefore, by means of the impregnation, a non-porous, dense surface is created so that during the subsequent application of the washcoat suspension, no water can get into the porous support body. The inorganic particles present in the impregnation therefore seal the individual pores. This is especially useful in the preferred area of application of the formation of an ASC sub-region on a catalytically active all-active extrudate subsequent to an SCR-active sub-region. In this rear ASC-active sub-region, the porosity of the support body for the desired SCR activity in the front region is no longer essential.

Expediently, the at least one inorganic component has inorganic particles having a mean particle size in the range of about 1-100 nm. An effective clogging of the pores is ensured by means of this particle size. The pores in the support body typically have a size of greater than 10 nm and particularly greater than 50-100 nm.

For the avoidance of doubt, the D50 (i.e. median particle size) and D90 measurements were obtained by Laser Diffraction Particle Size Analysis using a Malvern Mastersizer 2000, which is a volume-based technique (i.e. D50 and D90 may also be referred to as Dv50 and Dv90 (or D(v,0.50) and D(v,0.90)) and applies a mathematical Mie theory model to determine a particle size distribution. Diluted washcoat samples were prepared by sonication in distilled water without surfactant for 30 seconds at 35 watts.

This mean particle size is particularly significant for the embodiment variant in which the inorganic component penetrates into the surface region of the support body. Mean particle size is understood to mean in this case the mean size of the particles (if not spherically symmetrical particles then this corresponds to the maximum length of the particle) of a particle distribution, for example a Gaussian distribution.

In the case of the formation of the intermediate layer, larger particles may also be used since in this case penetration into the pores is not absolutely necessary.

In the case of the formation of the inorganic intermediate layer, this is applied as already mentioned in the preferred configuration, i.e. a dense, ceramic coating. In addition to the abovementioned inorganic components, the intermediate layer therefore also comprises binder components. These binder components are typically aluminium oxides, silicon oxides and/or, zirconium oxides of which the proportion is, for example, in the region of 10-30% by volume.

The intermediate layer generally has a layer thickness in the region of preferably 1-50 µm. The layer thickness of the intermediate layer is in this case preferably less than the layer thickness of the washcoat coating applied over it. This typically has a layer thickness in the region of 30 to 150 µm.

The finished intermediate layer, i.e. after the temperature treatment (sintering), expediently has an aluminium oxide and/or a silicon oxide as main constituent. The proportion of these oxides in the intermediate layer in this case is in particular in the range of 50-100% by volume. Overall, a stable, durable and dense ceramic intermediate layer is formed by such an intermediate layer, which reliably prevents an ion migration between the support body and the applied washcoat coating.

As already mentioned, the support body consists of a catalytically active material. Here, the support body is formed in particular as an extruded support body as a so-called all-active extrudate. As an alternative to the configuration as an extruded all-active extrudate body of catalytically active material, a non-extruded support body and/or an inert support body may also be used composed of catalytically inactive material.

In the case of the use of an inert support body, the inert body is preferably treated with a washcoat coating for the formation of the SCR activity, as can be found, for example, in DE 102014110811 A1.

The support body is further preferably formed as a honeycomb body having flow channels such that the exhaust gas flows through the support body during operation.

In various embodiment variants, different materials are used for the catalytically active material.

In a preferred configuration, vanadium, particularly a vanadium oxide, is used as catalytically active material which is embedded in a support material composed of a metal oxide for the formation of the support body. This particularly takes the form in this case of a vanadium-titanium system preferably supplemented with tungsten oxide. ($V_2O_5/TiO_2$ or $V_2O_5/WO_3/TiO_2$). In this case, the proportion of vanadium oxide is typically in the range of 1-5% by weight. The vanadium-titanium system may optionally also comprise a molybdenum oxide. Alternative support materials to titanium oxide comprise fireproof metal oxides, such as aluminium oxide, silicon dioxide, zirconium oxide, cerium oxide and also physical mixtures or composites thereof.

In the preferred vanadium oxide/metal oxide system, the catalytically active proportion, i.e. the proportion of the vanadium oxide/metal oxide system is conventionally 70 to 90% by weight. The remaining proportions are occupied by binder components, such as clays, inorganic supporting fibres, for example, glass fibres and stabilizers.

The support body preferably has the following composition: 80 to 90% by weight of a vanadium-titanium system, particularly 84.5% by weight, 6 to 10% by weight of clays, particularly 7.5% by weight and furthermore preferably a proportion of fibres, particularly a proportion of glass fibres in the range between 5 and 7% by weight, particularly 8.0% by weight. The vanadium-titanium system particularly takes the form of a vanadium pentoxide/titanium dioxide/tungsten trioxide system. The titanium dioxide contained in this vanadium-titanium system typically has a proportion by weight of about 70 to 80% by weight and particularly of 74% by weight. The tungsten trioxide has a proportion of about 5-12% by weight, preferably of about 8% by weight and the vanadium pentoxide has a proportion by weight of about 1 to 5 and preferably of about 1.7% by weight. The weight values are each based on the total weight of all components of the catalyst in the initial dry state, i.e. before processing the catalyst composition.

The proportions mentioned here refer in each case to the proportions by weight based on a dry ceramic composition from which the ceramic body is then prepared, for example, by extrusion and subsequent sintering. Dry ceramic composition is here understood to mean the proportions by weight of the individual components in the pulverulent starting state.

As an alternative to the use of a vanadium oxide, vanadium-iron compounds, for example, may also be used as catalytically active component, particularly iron vanadate ($FeVO_4$) and/or iron aluminium vanadate ($Fe_{0.8}Al_{0.2}VO_4$).

Furthermore, as an alternative to the titanium-vanadium-tungsten systems already described above, titanium-vanadium-tungsten-silicon systems or titanium-vanadium-silicon systems and also mixtures thereof may be used as further oxidic systems.

Alternatively, molecular sieves are used as support body, particularly zeolites or SAPOs. These molecular sieves are preferably ion-exchanged molecular sieves, wherein a framework unit of the molecular sieve has been replaced by a promoter metal and is thus part of the framework structure of the molecular sieve. Alternatively, such a promoter metal may also be embedded in the free space of the framework structure. The promoter metals used are particularly copper and iron.

In an alternative configuration, such a vanadium-based catalyst in a metal oxide support body is combined with catalytically active molecular sieves, particularly with zeolites, which have been exchanged preferably with a promoter metal, particularly iron or copper ions. In this case, a catalytically active support body is formed, such as can be found in particular in DE 112013000477 T5.

Depending on the specific field of application, as an alternative or in addition to vanadium, other catalytically active components can also be provided. Thus, the catalyst need not necessarily be formed as SCR catalyst. The catalyst may in principle also as so-called wall-flow filters, as oxidation catalyst, as three-way catalytic converter and also as so-called CSF catalyst. Such CSF catalysts (catalysed soot filter) are especially wall-flow filters which are used in the automotive sector. In this case, a honeycomb filter is preferably used comprising a honeycomb body having an arrangement of intersecting porous walls. These define first and second channels extending in the longitudinal direction. The first channels are sealed at a first end and the second channels are sealed at a second end of the honeycomb body. For the filter effect, the exhaust gas flows through the porous walls of the first channels into the second channels.

The support body in this case further typically has a porosity of >40%, i.e. 40% of the volume of the support body (without the flow channels for the exhaust gas contained therein) are formed by pores. The porosity can for example be measured using the known mercury porosimetry.

The object of the invention is further achieved by a method for preparing a catalyst with the features of claim 15. To prepare the catalyst with the impregnation, an impregnating agent is firstly applied to the support body. This comprises at least one inorganic, catalytically inactive component and serves to form the permanent inorganic and non-catalytic impregnation. Subsequently, a washcoat coating is applied to the impregnation. To form the impregnation, the support body with the applied impregnating agent is subjected to a temperature treatment. To apply the impregnating agent, this is introduced into the support body close to the surface such that the porosity of the support body is reduced at least in the region of the surface. Alternatively, or additionally, the support agent is applied as impregnation to the surface of the support body to form an additional inorganic and catalytically inactive intermediate layer.

According to a first embodiment variant, the impregnating agent is applied to the finished sintered support body, i.e. a ceramic support body. As an alternative here, the impregnating agent is applied to a still unsintered but already dried precursor product of the ceramic support body. In the case of an extruded honeycomb catalyst, the impregnating agent is therefore applied after the extrusion process and in particular after a drying process of the extruded body but before sintering.

In view of the sequence of applying the impregnation and the subsequent washcoat coating, an intermediate sintering is provided after the application of the impregnating agent according to a first variant. Alternatively, here, the washcoat coating is firstly applied to the unsintered impregnating agent and a common heat treatment (sintering) is conducted. For this variant, the impregnating agent and the washcoat suspension are applied optionally to a dried precursor product or to an already fully sintered ceramic support body.

To apply the impregnation, known methods for applying a washcoat coating can in principle be used.

In this case, a suitable composition is selected for the washcoat coating. To form an ASC sub-region by means of the washcoat coating, a noble metal-containing coating known per se is in particular applied, such as can be found, for example, in DE 102014110811 A1.

Figure 2:
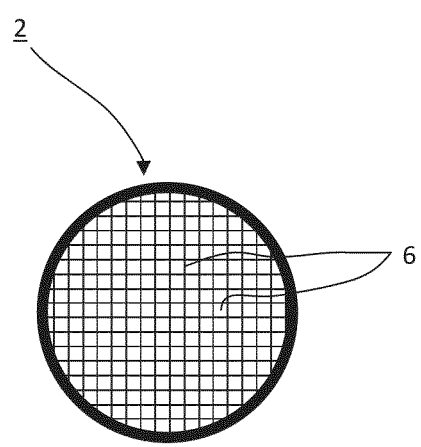
Figure 3:
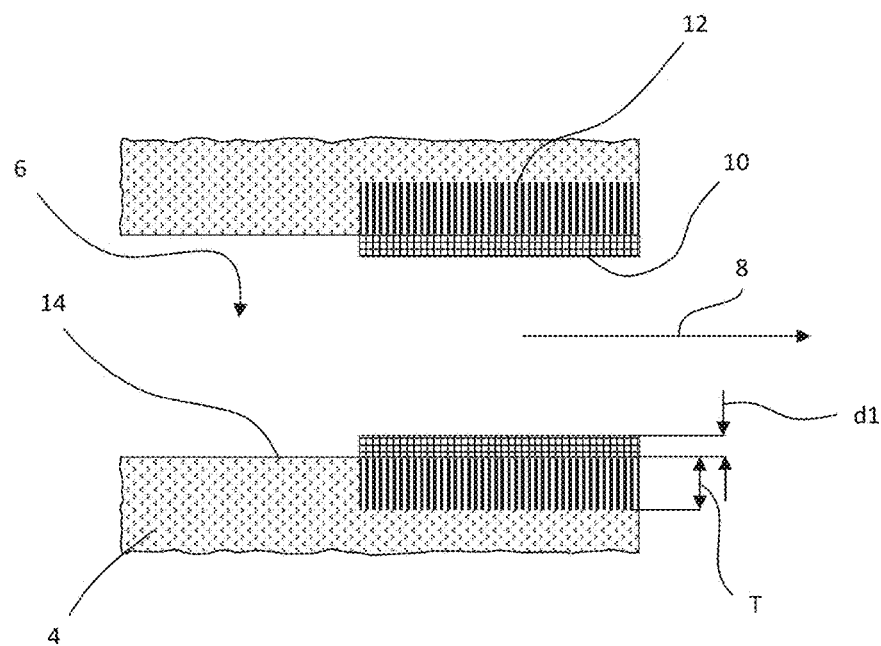
Figure 4:
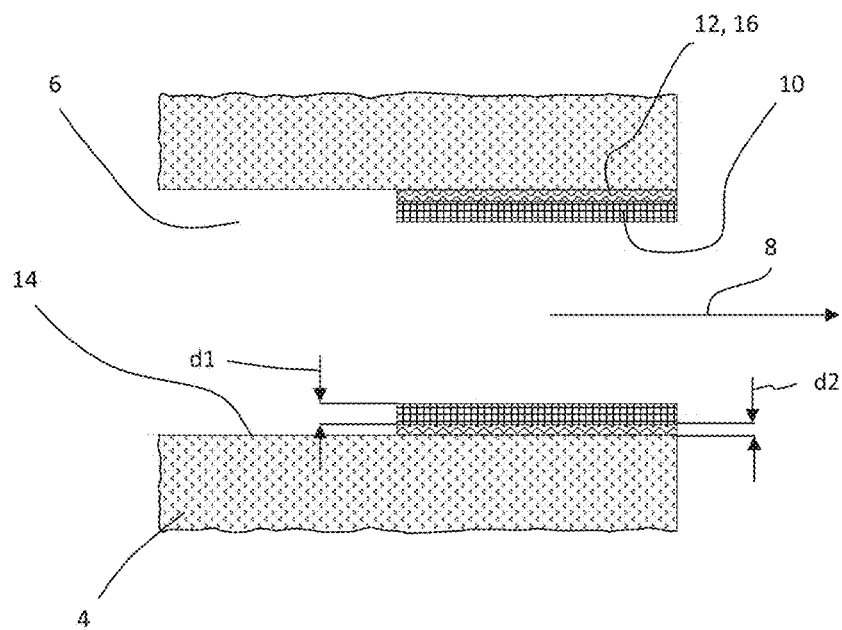

A working example of the invention will be explained in more detail below with reference to the figures. These each show in highly simplified representations:

FIG. 1 a side view of an extruded honeycomb catalyst having a front SCR active sub-region and a rear ASC active sub-region;

FIG. 2 a frontal view of the catalyst according to FIG. 1;

FIG. 3 a partial sectional view through the support body in the region of a flow channel according to a first embodiment variant with an impregnation applied in a region close to the surface; and FIG. 4 a view comparable to FIG. 3 according to a second variant with an intermediate layer applied as impregnation between the support body and a washcoat coating.

In the figures, identical parts are each provided with the same reference numerals.

A catalyst 2 shown in FIG. 1 is formed in the working example as an all-active extrudate honeycomb body. The catalyst 2 in this case has a support body 4 which is catalytically active. The support body 4 used here is in particular a vanadium titanium system. The support body 4 is formed as a honeycomb preferably with circular cross-sectional area, which is apparent from FIG. 2. This has numerous flow channels 6, through which an exhaust gas to be treated flows in a direction of flow 8 during operation. In a front sub-region, the catalyst 2 is formed exclusively by the catalytically active support body 4. In said region, it is formed as an SCR sub-region 2A. In the direction of flow 8, a rear region provided with a washcoat coating 10 is joined to the SCR sub-region. This is selected in the working example such that in the rear sub-region an ASC sub-region 2B is formed.

The support body 4 in this case is a highly porous ceramic body having a porosity of 40 to 60% and especially 50%. The pores here customarily have a pore size of greater than 10 nm and preferably greater than 100 nm.

Honeycomb catalysts of this type are used especially in motor vehicles for exhaust gas treatment. For this purpose, a respective catalyst 2 is introduced into the exhaust gas system of a motor vehicle.

In the course of preparation, the support body 4 is provided with an impregnation 12 in the region of the ASC sub-region 2B before applying the washcoat coating 10, as is illustrated in detail with reference to FIGS. 3 and 4 below.

FIGS. 3 and 4 each show partial sectional views of the honeycomb catalyst 2 in the region of a flow channel 6. Depicted in each case is the partial region at the junction of the SCR sub-region 2A to the ASC sub-region 2B.

In the course of preparation, in both embodiment variants, a surface 14 of the support body 4 is provided with an impregnating agent in each case. This is preferably carried out by dipping the support body 4 in the liquid impregnating agent and specifically only in the sub-region in which the ASC sub-region 2B is to be formed.

According to the first embodiment variant depicted in FIG. 3, the impregnating agent is formed such that it penetrates into a sub-region close to the surface of the support body 4. The penetration depth T is preferably in the range of 5 to 20% of the wall thickness in this case. The typical wall thickness in an extruded honeycomb catalyst in the automotive sector is 200 to 300 µm.

Of particular significance is the fact that the impregnating agent comprises inorganic constituents which clog the pores of the support body 4 in the region of the impregnation 12 and seal them. In this case, the impregnating agent comprises inorganic particles having a particle size preferably in the range between 1 and at most 100 nm, particularly in the range between 20 and 50 nm. By means of the impregnation 12, the originally porous surface 14 of the support body 4 is therefore sealed. Subsequently, the washcoat coating 10 is applied. This is usually carried out by applying in turn a suspension and subsequently subjecting it to a temperature treatment. Particularly in the all-active extrudate preferred here, such washcoats are applied as a relatively liquid aqueous solution. By means of the impregnation 12, introducing the aqueous washcoat solution into the support body 4 is at least substantially and preferably completely avoided.

In this way, in the application of the washcoat coating, the water contained in the washcoat suspension can remain, preventing concentration and resultant thickening of the washcoat suspension, so that overall a homogeneous, uniform washcoat coating is formed with a constant coating depth. This typically has a layer thickness d1 in the region of 30 to 150 µm. Furthermore, complete blockage of the channels can be avoided.

In contrast to the embodiment variant of FIG. 3, in the embodiment variant of FIG. 4, the impregnation 12 is formed in the manner of an intermediate layer 16. This is thus formed on the surface 14 of the support body 4. Here, it is also possible that in the intermediate layer 16, some of the impregnating agent also penetrates into the region of the support body 4 close to the surface so that, in addition to the intermediate layer 16, impregnating agent is also present in the support body 4. The intermediate layer 16 in the finished ready-to-use state is a ceramic intermediate layer preferably comprising a high proportion (50-100% by volume) of aluminium oxide and/or silicon oxide. The impregnating agents applied are liquid substances, particularly sols, for example titanium sols or silicon sols, water glass, silanes, particularly alkylsilanes, siloxanes or also phosphates, particularly as aqueous solutions. In this case, preference is given to applying aluminium phosphates in aqueous solution. The intermediate layer 16 in this case, for example, especially has a composition with 60-90% titanium oxide and 10-40% silicon oxide and particularly with 80% $TiO_2$ and 20% $SiO_2$.

The intermediate layer 16 has in this case a layer thickness d2 in the region between 1 and 50 µm. The layer thickness d2 is in this case less than the layer thickness d1 of the washcoat coating 10.

WORKING EXAMPLE 1

The effectiveness of the impregnation for reducing the water uptake was investigated for the following washcoat coating as follows:

A porous, honeycombed support body 4 was first provided without impregnation (comparative body) and a further support body with impregnation (test body).

For the impregnation, the support bodies 4 were inserted into a 25% (test body 1) and a 50% (test body 2) aluminium phosphate solution for 10 minutes. To prepare the 25% solution, LITHOPIX P1 was mixed with water in a 1:1 ratio. The 50% solution is the LITHOPIX P1 solution. Excess solution was subsequently removed. For this purpose, the support body 4 was blown with compressed air. The support body was then dried in the drying cabinet at 60° C. for 24 h and finally baked at 60° C. for 1.5 h.

The bodies were dipped in water under identical conditions (same water temperature, same immersion time) and subsequently weighed. The weight increase corresponds to the water uptake. The water uptake by the comparative body was taken as standard (normalized to 100% water uptake).

The results are as follows:

| Support body | Water uptake [in %] |
| --- | --- |
| Comparative body | 100 |
| Test body 1 | 84 |
| Test body 2 | 50 |

A distinctly reduced water uptake is therefore achieved with the impregnation, wherein the solution with the higher solids content results in a lower water uptake.

WORKING EXAMPLE 2

The effectiveness of the intermediate layer 16 for maintaining the catalytic activity, i.e. a decrease in the age-related reduction of the activity, was investigated as follows: An SCR catalyst (honeycomb catalyst) was provided in which first a support body 4 was provided with washcoat coating 10 applied directly to the support body 4 (comparative catalyst). As test catalyst, an identical support body 4 was provided initially with the intermediate layer 16 and subsequently the identical washcoat coating 10 as the for the comparative catalyst was applied. An aluminium oxide layer was applied as intermediate layer 16. Both catalysts were aged under realistic conditions. For this purpose, they were perfused for 100 h with a hot exhaust gas at 580° C. from a motor on an engine test bench with ammonia metering. The ammonia conversion (ratio of the ammonia on the inlet side and the outlet side) was then measured as a criterion for the catalytic activity at various temperatures under identical measuring conditions. The measuring conditions were as follows: space velocity (ratio of gas volume stream to catalyst volume): 150 000/h; NH3 fraction: 500 ppm; $CO_2$: 4.5%; $H_2O$: 5%; CO: 200 ppm; $O_2$: 12%, remainder $N_2$.

The measured $NH_3$ conversion was as follows (normalized to 100% based on comparative catalyst):

|  | Exhaust gas temperature [° c.] | | | |
| --- | --- | --- | --- | --- |
|  | 250 | 300 | 350 | 400 |
| Comparative catalyst [%] | 100 | 100 | 100 | 100 |
| Test catalyst [%] | 100 | 175 | 157 | 126 |

The test catalyst shows a distinctly improved catalytic activity compared to the comparative catalyst, particularly in the average temperature range.

REFERENCE NUMERAL LIST

2 Catalyst
2A SCR sub-region
2B ASC sub-region
4 Support body
6 Flow channel
8 Direction of flow
10 Washcoat coating
12 Impregnation
14 Surface
16 Intermediate layer
T Penetration depth
d1 Layered washcoat
d2 Intermediate layer thickness

The invention claimed is:

1. A catalyst comprising a porous, ceramic support body having at least a portion of a surface of the ceramic support body being coated with a layer of a catalytically active washcoat coating, wherein the support body further comprises a layer of a permanent catalytically inactive material comprising at least one catalytically inactive inorganic component, and wherein the layer of the permanent catalytically inactive material:
   a) is at least partially present as a layer between the surface of the porous ceramic support body and the catalytically active washcoat coating; and/or
   b) is impregnated in the pores of the ceramic support body underneath the surface of the ceramic support body and beneath the catalytically active washcoat coating, such that the porosity of the surface of the ceramic support body beneath the catalytically active washcoat coating is reduced.

2. The catalyst according to claim 1, wherein the support body is a monolithic component and only a sub-region of the monolithic component is provided with the permanent catalytically inactive material.

3. The catalyst according to claim 1, wherein the support body is a monolithic component having a selective catalytic reduction (SCR) sub-region and an ammonia slip catalyst (ASC) sub-region, the SCR and ASC sub-regions positioned in series, such that when placed in the path of a exhaust gas flow, the SCR sub-region is upstream of the ASC sub-region, wherein the permanent catalytically inactive impregnation is in the ASC sub-region.

4. The catalyst according to claim 1, wherein the at least one catalytically inactive inorganic component is water glass, a silane, a siloxane, a phosphate, or a combination of any two or more thereof.

5. The catalyst according to claim 4, wherein the silane is an alkylsilane or the phosphate is an aluminum phosphate or both.

6. The catalyst according to claim 1, wherein the at least one catalytically inactive inorganic component is an aluminum phosphate.

7. The catalyst according to claim 1, wherein the pores are sealed by the impregnation.

8. The catalyst according to claim 1, wherein the at least one inorganic component has inorganic particles having a mean particle size in the range of from 1-100 nm.

9. The catalyst according to claim 1, wherein the impregnation is applied as a ceramic, dense coating which forms an intermediate layer.

10. The catalyst according to claim 1, wherein the layer thickness of the impregnation is in the range of from 1 to 50 µm and less than the layer thickness of the washcoat coating.

11. The catalyst according to claim 1, wherein the impregnation comprises aluminum oxide and/or silicon oxide and/or titanium oxide and the proportion of which in the impregnation is in the range of from 50 to 100% by volume.

12. The catalyst according to claim 1, wherein the support body consists of a catalytically active material.

13. The catalyst according to claim 1, wherein the support body is an extruded support body.

14. The catalyst according to claim 13, wherein the support body is a honeycomb.

15. The catalyst according to claim 1, wherein the support body has as catalytically active material a vanadium oxide in a support material composed of a metal oxide.

16. The catalyst according to claim 15, wherein the metal oxide is a titanium oxide.

17. The catalyst according to claim 1, wherein the support body has a porosity of greater than 40%.

18. The catalyst according to claim 1, wherein the at least one catalytically inactive inorganic component is a sol.

19. The catalyst according to claim 18, wherein the sol is a titanium sol or a silicon sol.

20. A method for preparing a catalyst according to claim 1, comprising:
   (a) applying an impregnating agent comprising at least one catalytically inactive inorganic component to a porous support body by:
      (i) applying the impregnating agent to at least a portion of a surface of the support body so as to impregnate and reduce the porosity of the portion of the surface of the support body; and/or
      (ii) applying the impregnating agent to the support body, over at least a portion of a surface of the support body;
   (b) heat treating the support body to provide a porous ceramic support body having a surface at least partially coated by a layer of a permanent catalytically inactive material;
   (c) applying a washcoat coating of catalytically active material over the layer of a permanent catalytically inactive material, and
   (d) subjecting the catalyst to a second temperature treatment;

such that the catalytically inactive layer is positioned between the porous support body and the catalytically active washcoat coating.

21. The method of claim 20, wherein the porous support body is an extruded support body.

* * * * *